(12) United States Patent
Riedel

(10) Patent No.: US 7,415,006 B2
(45) Date of Patent: Aug. 19, 2008

(54) METHOD AND SYSTEM FOR TRANSPORTING DATA PACKETS OF A DATA STREAM

(75) Inventor: Manfred Riedel, München (DE)

(73) Assignee: Siemens Aktiengesellschaft, Munich (DE)

( * ) Notice: Subject to any disclaimer, the term of this patent is extended or adjusted under 35 U.S.C. 154(b) by 1118 days.

(21) Appl. No.: 10/319,839

(22) Filed: Dec. 16, 2002

(65) Prior Publication Data

US 2003/0112807 A1   Jun. 19, 2003

(30) Foreign Application Priority Data

Dec. 14, 2001   (DE) ................. 101 61 509

(51) Int. Cl.
*H04L 12/28* (2006.01)
(52) U.S. Cl. ............. 370/352; 370/353; 370/354; 370/355; 370/356; 370/398; 370/395.41; 370/395.4; 370/422; 370/423; 370/396
(58) Field of Classification Search ............ 370/352, 370/353, 354, 356, 398, 395.4, 395.41, 422, 370/423
See application file for complete search history.

(56) References Cited

U.S. PATENT DOCUMENTS

| | | | | |
|---|---|---|---|---|
| 5,649,109 | A * | 7/1997 | Griesmer et al. ............ | 709/242 |
| 6,064,653 | A * | 5/2000 | Farris ......................... | 370/237 |
| 6,115,373 | A * | 9/2000 | Lea ............................ | 370/355 |
| 6,400,712 | B1 * | 6/2002 | Phillips ...................... | 370/355 |
| 6,549,543 | B1 * | 4/2003 | Shin ........................... | 370/474 |
| 6,996,663 | B1 * | 2/2006 | Marsteiner .................. | 711/108 |
| 7,075,920 | B2 * | 7/2006 | Hallenstal et al. .......... | 370/352 |
| 7,124,205 | B2 * | 10/2006 | Craft et al. .................. | 709/250 |
| 2002/0067740 | A1 * | 6/2002 | Vestal et al. ................ | 370/465 |
| 2002/0093949 | A1 * | 7/2002 | Yasue et al. ................ | 370/356 |
| 2002/0122418 | A1 * | 9/2002 | Bernstein et al. ........... | 370/352 |
| 2002/0141395 | A1 * | 10/2002 | Chang ........................ | 370/355 |
| 2003/0007496 | A1 * | 1/2003 | Brown et al. ............... | 370/401 |
| 2003/0133461 | A1 * | 7/2003 | Ho et al. ................ | 370/395.52 |
| 2003/0189922 | A1 * | 10/2003 | Howe ......................... | 370/352 |
| 2003/0227942 | A1 * | 12/2003 | Maher et al. ............... | 370/468 |

FOREIGN PATENT DOCUMENTS

| | | |
|---|---|---|
| DE | 19728878 A1 | 1/1998 |
| EP | 0829995 A2 | 3/1998 |
| WO | WO00/28778 | 5/2000 |
| WO | WO01/80503 | 10/2001 |

* cited by examiner

*Primary Examiner*—Edan Orgad
*Assistant Examiner*—Wutchung Chu
(74) *Attorney, Agent, or Firm*—Staas & Halsey LLP

(57) ABSTRACT

For transporting data packets of a data stream between a packet-oriented network (LAN) and a channel-oriented data stream processing module (VMOD), a data stream controller (ST) is provided which, via a data channel allocation module (VMUX), accesses an interface module (PS) for exchanging the data packets with the network (LAN) and/or accesses the data stream processing module (VMOD). The data stream controller (ST) transmits a data channel allocation information item (DKl1, DKl2) to the interface module (PS) and/or to the data stream processing module (VMOD). Using a data channel allocation information item (DKl1, DKl2) in each case transmitted, the data packets are transmitted directly between the interface module (PS) and the data stream processing module (VMOD), bypassing the data channel allocation module (VMUX).

17 Claims, 2 Drawing Sheets

METHOD AND SYSTEM FOR TRANSPORTING DATA PACKETS OF A DATA STREAM

CROSS REFERENCE TO RELATED APPLICATIONS

This application is based on and hereby claims priority to German Application No. 101 61 509.4 filed on Dec. 14, 2001, the contents of which are hereby incorporated by reference.

BACKGROUND OF THE INVENTION

The invention relates to a method and a system for transporting data packets of a data stream between a packet-oriented data network and at least one channel-oriented data stream processing module. In particular, one aspect of the invention relates to data transport in the context of a so-called stream architecture.

Data streams and, in particular, communication data streams, such as e.g. voice, video and/or multimedia data streams, are increasingly transmitted in the form of discrete data packets via packet-oriented networks, such as e.g. local area networks (LAN) or wide area networks (WAN). To receive and process further data streams transmitted via a packet-oriented network, its data packets must be extracted from the network and supplied to appropriate data processing modules, such as e.g. software applications or digital signal processors. The further processing can relate to e.g. decoding, decompression, outputting or conversion to a circuit-oriented transmission protocol. Such data stream processing modules are in most cases of multichannel design.

To transmit data packets of a data stream between a packet-oriented network and a channel-oriented data stream processing module, the so-called stream architecture known from the environment of the Unix operating system is found to be particularly advantageous. The stream architecture is of modular composition of predetermined layers of standard software components. As a consequence, the stream architecture is highly portable and allows for simple integration of additional services. To transmit data packets between a packet-oriented network and a channel-oriented data stream processing module, according to the stream architecture, an interface module for exchanging the data packets with the network, an interface driver, a so-called voice multiplexer for data channel allocation, a so-called voice module for preprocessing the useful voice data and a driver for a voice-processing signal processor or a voice-processing application must be provided. The modules are in each case coupled via input and output queues in the order specified. Data are transported via the modules in the order specified. The data transport is controlled by a data stream controller (call processing) which accesses the other modules via the voice multiplexer.

However, the type of data transport specified requires relatively high processor power, particularly with a high number of data channels. In addition, the data packets are delayed in a not insignificant manner.

SUMMARY OF THE INVENTION

It is one possible object of the present invention to specify a method and system for transporting data packets of a data stream between a packet-oriented network and a channel-oriented data stream processing module, particularly in the context of a stream architecture, which method has low computing requirement and less delay.

To transport data packets of a data stream, e.g. of voice, video, multimedia and/or file data, between a packet-oriented network, e.g. a local area network (LAN) or a wide area network (WAN), and at least one channel-oriented data stream processing module, particularly in the context of a stream architecture, a data stream controller for controlling the data packet transport is provided which, via a data channel allocation module, accesses an interface module for exchanging the data packets with the network and/or accesses the at least one data stream processing module. The at least one data stream processing module is advantageously designed as a multichannel module and can be implemented e.g. by a software module and/or a digital signal processor. The data channel allocation module allocates data to one or more data channels or data channels to one another. The data stream controller transmits a data channel allocation information item to the interface module and/or to the at least one data stream processing module. Using a data channel allocation information item transmitted in each case, the data packets are transmitted directly between the interface module and the at least one data stream processing module, bypassing the data channel allocation module.

Compared with a known use of a stream architecture, the above method and system allow for a distinct reduction in the delay of useful data packets between the packet-oriented network and a data stream processing module whilst largely retaining the stream architecture. The delay is reduced since the useful data packets have to pass through fewer software layers and, in particular, fewer input and output queues between the software layers. In addition, the computing power required for transporting the data is also reduced. In consequence, one aspect of the invention can be used particularly advantageously in so-called embedded systems with simple and thus inexpensive processors.

According to an advantageous embodiment, the data channel allocation information item can be transmitted during the setting-up of a data stream, particularly during the setting-up of a connection.

Furthermore, the data channel allocation information item, which is transmitted to the interface module, can comprise a queue identifier identifying an input queue of the at least one data stream processing module. Using the queue identifier transmitted, the interface module can transmit the data packets to be transmitted directly into the respective matching input queue of a data stream processing module.

Furthermore, the data channel allocation information item, which is transmitted to the at least one data stream processing module, can comprise an address information item by which a data channel allocation information item transmitted to the interface module is identified. This address information item can be transmitted by the respective receiving data stream processing module with the data packets to be transmitted to the interface module. The address information item transmitted from the data stream processing module to the interface module can be used by the latter to provide faster access to a data channel allocation information item stored in a channel allocation memory. The address information item preferably specifies a respective address offset of the relevant data channel allocation information item within the channel allocation memory.

According to an advantageous embodiment of the method, the data packets are transmitted in accordance with the so-called RTP (Real Time Protocol) which has very good real-time characteristics.

Furthermore, the at least one data stream processing module can be implemented by channel-individual entities of a program-oriented object class.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
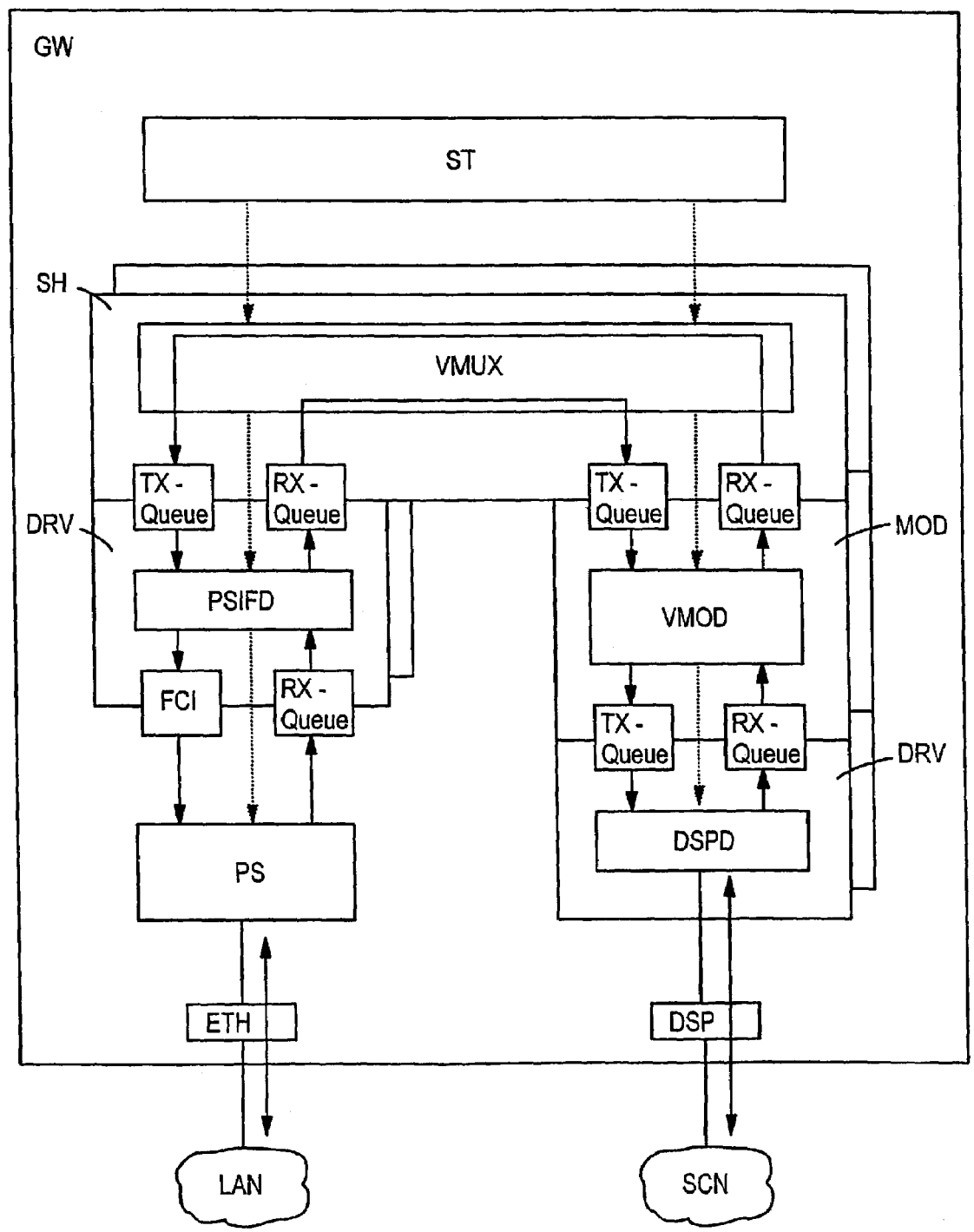
FIG. 1 shows a gateway system according to the stream architecture for transporting data packets according to the related art.

Reference will now be made in detail to the preferred embodiments of the present invention, examples of which are illustrated in the accompanying drawings, wherein like reference numerals refer to like elements throughout.

Figure 2:
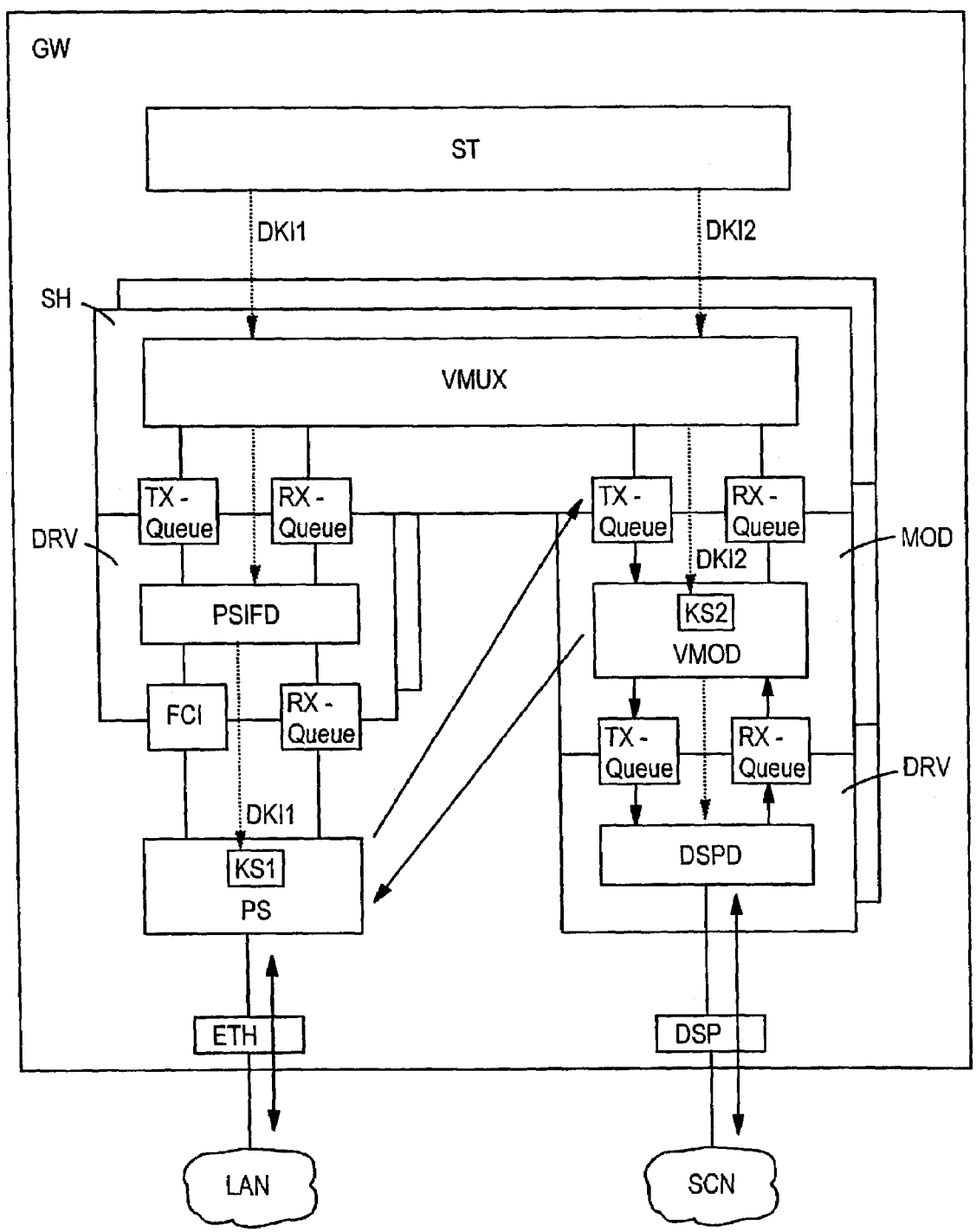
FIG. 2 shows a gateway arrangement according to the stream architecture for transporting data packets in accordance with one aspect of the invention.

FIGS. 1 and 2 in each case diagrammatically show a gateway system GW according to the stream architecture for transporting data streams, including data packets, between a local area network LAN as packet-oriented network and a switched communication network SCN. The gateway system GW is preferably implemented as a so-called embedded system.

In the text which follows, transmission of voice data streams in the context of real-time voice links will be considered as an example of the transmission of the data streams. The following statements apply correspondingly to other types of data streams, such as e.g. video data streams, multimedia data streams and/or file data streams. In the present exemplary embodiment, the data packets of the data streams are transmitted in accordance with the RTP (Real Time Protocol) which is based on the UDP (User Datagram Protocol). The UDP, in turn, is based on the Internet protocol.

The gateway system GW is physically coupled via a so-called Ethernet network card ETH to the local area network LAN and via a digital signal processor DSP to the switched communication network SCN. The signal processor DSP has a multiplicity of, typically approx. 30, data channels which are in each case used for the channel-individual processing of useful data of a respective voice data stream. As a result, the voice data streams can be compressed or decompressed, for example, or coded or decoded (e.g. according to ITU-T Recommendation G.711) on transition from the or into the switched communication network SCN.

The gateway system GW has an interface module PS, coupled to the Ethernet network card ETH, for extracting and injecting data packets from or into, respectively, the local area network LAN. The interface module PS detects, among other things, the UDP destination port number of each data packet received from the local area network. The UDP destination port numbers detected are in each case compared with UDP port numbers stored in the interface module PS, which are in each case allocated to one data channel. When a detected UDP destination port number of a received data packet matches a stored UDP port number, this data packet is allocated to the correspondingly allocated data channel. The interface module PS forwards only those received data packets for whose UDP destination port number a connection, i.e. a data channel, is set up. Such an interface module is frequently also called a "packet sniffer".

The gateway system GW also has a data stream controller ST, e.g. in the form of a call control for voice connections.

Other functional components of the gateway system GW are subdivided into layers according to the stream architecture known from the environment of the UNIX operating system. The stream architecture distinguishes between a so-called "stream head" layer which forms an interface to user processes, an optional module layer and a driver layer which forms an external interface.

In the present exemplary embodiment, a driver layer DRV is in each case provided both on the side of the local area network LAN and on the side of the switched communication network SCN in the gateway system GW. On the side of the switched communication network SCN, the driver layer DRV is followed by a module layer MOD. Both sides are coupled by a common "stream head" layer SH.

In the context of the stream architecture specified, the gateway system GW has on the side of the local area network LAN an interface driver PSIF which is associated with the driver layer DRV and which is coupled to the interface module PS. On the side of the switched communication network SCN, the gateway system GW also has a signal processor driver DSPD associated with the driver layer DRV and coupled to the signal processor DSP, and a data stream processing module VMOD associated with the module layer MOD and coupled to the signal processor driver DSPD. The data stream processing module VMOD and the interface driver PSIF are coupled to one another by a data channel allocation module VMUX belonging to the "stream head" layer SH. The specified coupling of the individual modules VMOD, VMUX and drivers PSIFD, DSPD is done via interposed queues TX queue and RX queue according to the stream architecture. For each direction of transmission and each data channel, a separate queue TX queue and RX queue, respectively, is set up. As an exception, only a simple function call interface FCI is provided between the interface driver PSIFD and the interface module PS for transmissions in the direction of the local area network LAN.

The individual layers SH, MOD and DRV, and thus the modules VMOD, VMUX and the drivers PSIFD, DSPD, are in each case designed to be multichannel devices, that is to say for the parallel processing of a multiplicity of data channels or data streams or connections. The multichannel characteristic is indicated in the drawing by a representation of several levels in FIGS. 1 and 2. The multichannel modules VMOD, VMUX and drivers PSIFD, DSPD and the channel-individual queues TX queue, RX queue are particularly advantageously implemented by channel-individual entities of a respective program-related object class. That is to say, for each data channel or data stream to be processed, an individual entity of a program-related object class of the respective module VMOD, VMUX or, respectively, driver PSIFD, DSPD or, respectively, of the respective queue TX queue, RX queue is generated. In this manner, approximately 30 data channels are typically set up.

The interface module PS is coupled to the data channel allocation module VMUX, formed by a number of entities, via the interface driver PSIFD. The interface driver PSIFD is essentially used for distributing the data packets, forwarded from the interface module PS, to the various channel-individual entities of the stream architecture. Such an interface driver is frequently also called a "packet sniffer interface driver".

In the present exemplary embodiment, the data stream processing module VMOD is implemented as a so-called voice module which carries out preprocessing of the data packets transmitted, e.g. setting the IP data packet headers. The signal processor driver DSPD coupled thereto drives the signal processor DSP.

In the present exemplary embodiment, the data channel allocation module VMUX is implemented as a so-called voice multiplexer and couples the components PSIFD and PS on the side of the local area network LAN to the components VMOD and DSPD on the side of the switched communication network SCN. The data channel allocation module VMUX allocates the data channels or entities of one side to the data channels or entities of the other side.

The data stream controller ST is coupled to the components PSIFD, PS, VMOD and DSPD via the data channel allocation module VMUX or, respectively, the "stream head" layer SH.

To set up and control data streams and connections, the data stream controller ST accesses—as indicated by dotted arrows—the specified components PSIFD, PS, VMOD and DSPD in a controlling manner via the data channel allocation module VMUX or, respectively, the "stream head" layer SH.

FIG. 1 shows a gateway system GW for the data transport according to the related art. The transmission path of the data streams is illustrated by continuously drawn arrows in this case. During the transmission of a data stream from the local area network LAN in the direction of the switched communication network SCN, the data packets of the data stream, which are transported in accordance with the RTP, are extracted by the Ethernet network card ETH and transmitted via the interface module PS, a queue RX queue, the interface driver PSIFD, a further queue RX queue, the data channel allocation module VMUX, a queue TX queue, the data stream processing module VMOD and a further queue TX queue to the signal processor driver DSPD. The signal processor driver DSPD assembles the received data packets to form a data stream and transmits the latter to the signal processor DPS which processes the data stream and finally forwards it in the direction of the switched communication network SCN. When a data stream is transmitted in the reverse direction, i.e. from the switched communication network SCN to the local area network LAN, the data stream passes through the specified components ETH, PS, PSIFD, VMUX, VMOD, DSPD, DSP in the reverse direction as illustrated by FIG. 1.

Since in the data stream transmission described in accordance with the related art a relatively large number of components and, particularly, of queues must be passed, the data stream is considerably delayed.

By comparison, FIG. 2 shows a gateway system GW for transporting data streams. The transmission path of the data streams is again illustrated by continuously drawn arrows. In this gateway system GW, the interface module PS has a connection table KS1 and the data stream processing module VMOD has an address table KS2.

To transmit data streams, e.g. in the context of voice connections, an individual data channel is allocated to each data stream by the data stream controller ST. This initializes the setting-up of a respective data stream in the gateway system GW. The UDP port numbers allocated to a respective data channel and to be monitored by the interface module PS are stored in the connection table KS1 and in the address table KS2.

The data stream controller ST transmits a queue identifier DKl1 to the interface module PS and an address information item DKl2 to the data stream processing module VMOD during the setting-up of a data stream allocated to a data channel. The data stream controller ST transmits the queue identifier DKl1 and the address information item DKl2—as indicated by dotted arrows—to the modules PS and VMOD during data stream control signaling via the data channel allocation module VMUX or, respectively, the "stream head" layer SH. The queue identifier DKl1 is stored in the connection table KS1 and the address information item DKl2 is stored in the address table KS2.

The queue identifier DKl1 identifies the input queue TX queue, allocated to the relevant data channel, of the data stream processing module VMOD. In the connection table KS1, the queue identifier DKl1 transmitted is allocated to the UDP port number allocated to the relevant data channel. The address information item DKl2, on the other hand, specifies an address offset of the queue identifier DKl1 within the connection table KS1. The address information item DKl2 is allocated to the UDP port number allocated to the relevant data channel in the address table KS2. The connection table KS1 and the address table KS2 are thus used as channel allocation memories.

During the transmission of the data stream from the local area network LAN in the direction of the switched communication network SCN, the data packets of the data stream, which are transported in accordance with the RTP protocol, are extracted by the ethernet network card ETH and transmitted to the interface module PS. On receiving a respective data packet, the interface module PS first attempts to find the UDP destination port number contained in the data packet in the connection table KS1. If a matching entry is found, the interface module PS reads out the queue identifier allocated to the UDP destination port number in the connection table KS1, in this case DKl1. Using the queue identifier DKl1 read out, the interface module PS then forwards the data packet directly to the input queue TX queue, thus identified, of the data stream processing module VMOD. The direct transmission is indicated by a continuously drawn arrow in FIG. 2. The further data transmission from the data stream processing module VMOD to the switched communication network SCN takes place as already explained in conjunction with FIG. 1.

During a transmission of a data stream from the switched communication network SCN to the local area network LAN, the data stream is divided by the signal processor driver DSPD into data packets which are transmitted to the data stream processing module VMOD. The data stream processing module VMOD adds to each of these data packets the address information item DKl2 stored in the address table KS2 and allocated to the UDP port number of the relevant data packet. The relevant data packet is then transmitted directly from the data stream processing module VMOD to the interface module PS. Using the attached address information item DKl2, which specifies the address offset of the queue identifier DKl1 within the connection table KS1, the interface module PS can determine the data channel, allocated to the transmitted data packet, by directly accessing the relevant entry within the connection table KS1. This makes it possible to avoid a time-consuming search through the connection table. Finally, the interface module PS forwards the relevant data packet via the Ethernet network card ETH into the local area network LAN.

Due to the method, the input and output queues of the interface module PS and of the data stream processing module VMOD are directly linked together, as it were, during the setting-up of the data stream, as a result of which an additional direct interface is set up between the two modules PS and VMOD. Via this additional interface, data packets can be transmitted directly between the interface module PS and the data stream processing module, bypassing both the interface driver PSIFD and the data channel allocation module VMUX.

Since, compared with the related art, the data packets to be transmitted have to pass through fewer modules, layers and queues and thus also fewer program routines, the delay of the data packets is considerably reduced. In addition, the computing power required for transporting the data is also reduced.

The invention has been described in detail with particular reference to preferred embodiments thereof and examples, but it will be understood that variations and modifications can be effected within the spirit and scope of the invention.

What is claimed is:

1. A method for transporting data packets of a data stream between a packet-oriented network and a channel-oriented data stream processing module, comprising:
   exchanging data packets with the packet-oriented network using an interface module;
   controlling the data packet transport with a data stream controller, which accesses, via a data channel allocation module, at least one of the interface module and the data stream processing module;

transmitting a data channel allocation information item from the data stream controller to at least one of the interface module and the data stream processing module; and transmitting data packets directly between the interface module and the data stream processing module based on the data channel allocation information item so as to bypass the data channel allocation module, wherein the data channel allocation information item is transmitted to the interface module, and the data channel allocation information item, which is transmitted to the interface module, comprises a queue identifier identifying an input queue of the data stream processing module.

2. The method as claimed in claim 1, wherein the data channel allocation information item is transmitted while setting-up a data stream.

3. the method as claimed in claim 1, wherein data channel allocation information items are sent from the data stream controller to both the interface module and the data stream processing module, the data channel allocation information item, which is transmitted to the data stream processing module, comprises an address information item, and the address information item identifies the data channel allocation information item transmitted to the interface module.

4. The method as claimed in claim 1, wherein the data packets are transmitted in accordance with a Real Time Protocol.

5. The method as claimed in claim 2, wherein the data channel allocation information item is transmitted to the interface module, the data channel allocation information item, which is transmitted to the interface module, comprises a queue identifier identifying an input queue of the data stream processing module.

6. The method as claimed in claim 5, wherein data channel allocation information items are sent from the data stream controller to both the interface module and the data stream processing module, the data channel allocation information item, which is transmitted to the data stream processing module, comprises an address information item, and the address information item identifies the data channel allocation information item transmitted to the interface module.

7. The method as claimed in claim 6, wherein the data packets are transmitted in accordance with a Real Time Protocol.

8. The method as claimed in claim 1, wherein data packets are transported between the packet-oriented network and a plurality of channel-oriented data stream processing modules.

9. The method as claimed in claim 1, wherein the data stream controller accesses both the interface module and the data stream processing module.

10. The method as claimed in claim 1, wherein the data stream controller accesses both the interface module and the data stream processing module, and data channel allocation information items are sent from the data stream controller to both the interface module and the data stream processing module.

11. A system to transport data packets of a data stream between a packet-oriented network and a channel-oriented data stream processing module, comprising:

an interface module to exchange the data packets with the network;

a data channel allocation module coupled to the interface module and to the data stream processing module;

a data stream controller, coupled to the data channel allocation module, to control the data packet transport, and transmit a data channel allocation information item;

a channel allocation memory provided in at least one of the interface module and the data stream processing module to store the data channel allocation information item; and an additional interface for direct transmission of the data packets by the data channel allocation information item stored in the channel allocation memory, the additional interface being provided between the interface module and the data stream processing module, wherein the data stream processing module has channel-individual input queues, data channel allocation information item is transmitted to the interface module, and the data channel allocation information item transmitted to the interface module comprises a queue identifier identifying one of the channel individual input queues.

12. The system as claimed in claim 11, wherein at least one of the data stream processing module and the data channel allocation module is implemented as a channel-individual entity of a program-related object class.

13. The system as claimed in claim 11, wherein at least one of the data stream processing module and the data channel allocation module is implemented as a channel-individual entity of a program-related object class.

14. The system as claimed in claim 11, wherein a plurality of channel oriented data stream processing modules are provided.

15. The system as claimed in claim 11, wherein data stream controller transmits a data channel allocation information item to each of the interface module and the data stream processing module, and a channel allocation memory is provided in each of the interface module and the data stream processing module.

16. A device comprising:

a data stream processing module connected to a plurality of data stream channels;

an plurality of input queues, each of the plurality of data stream channels having a corresponding input queue;

an interface module to receive data packets from a packet-oriented network;

a data stream controller to transmit the queue identifiers to the interface module and transmit address information items to the data stream processing module;

a first memory provided in the interface module to store a connection table identifying port numbers associated with the packets which can be received;

a first processor to associate port numbers with queues identified by the queue identifiers received from the data stream controller;

a second memory provided in the data stream processing module to store a second connection table identifying the plurality of data stream channels and the port numbers associated therewith; and a second processor to associate port numbers with data channels identified by the address information items received from the data stream controller, wherein the device bypasses a channel allocation module.

17. The device as claimed in claim 16, wherein the channel allocation module is a voice multiplexer.

* * * * *